United States Patent
Chi et al.

(10) Patent No.: US 11,430,265 B2
(45) Date of Patent: Aug. 30, 2022

(54) VIDEO-BASED HUMAN BEHAVIOR RECOGNITION METHOD, APPARATUS, DEVICE AND STORAGE MEDIUM

(71) Applicant: BEIJING BAIDU NETCOM SCIENCE TECHNOLOGY CO., LTD., Beijing (CN)

(72) Inventors: Zhizhen Chi, Beijing (CN); Fu Li, Beijing (CN); Hao Sun, Beijing (CN); Dongliang He, Beijing (CN); Xiang Long, Beijing (CN); Zhichao Zhou, Beijing (CN); Ping Wang, Beijing (CN); Shilei Wen, Beijing (CN); Errui Ding, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 224 days.

(21) Appl. No.: 17/022,219

(22) Filed: Sep. 16, 2020

(65) Prior Publication Data
US 2021/0192194 A1    Jun. 24, 2021

(30) Foreign Application Priority Data
Jan. 10, 2020 (CN) .......................... 202010025983.X

(51) Int. Cl.
*G06V 40/20* (2022.01)
*G06F 3/01* (2006.01)
(Continued)

(52) U.S. Cl.
CPC .............. *G06V 40/20* (2022.01); *G06F 3/011* (2013.01); *G06F 3/017* (2013.01); *G06N 3/02* (2013.01); *G06V 20/46* (2022.01)

(58) Field of Classification Search
CPC ........ G06V 40/20; G06V 20/46; G06F 3/011; G06F 3/017; G06N 3/02
(Continued)

(56) References Cited

U.S. PATENT DOCUMENTS 8,983,203 B2 * 3/2015 Ye ........................ G06V 40/165
382/199
2008/0147488 A1 * 6/2008 Tunick ............... G06Q 30/0273
382/209
(Continued)

*Primary Examiner* — Gabriel I Garcia
(74) *Attorney, Agent, or Firm* — Dilworth IP, LLC

(57) ABSTRACT

The present application discloses a video-based human behavior recognition method, apparatus, device and storage medium, and relates to the technical field of human recognitions. The specific implementation scheme lies in: acquiring a human rectangle of each video frame of the video to be recognized, where each human rectangle includes a plurality of human key points, and each of the human key points has a key point feature; constructing a feature matrix according to the human rectangle of the each video frame; convolving the feature matrix with respect to a video frame quantity dimension to obtain a first convolution result and convolving the feature matrix with respect to a key point quantity dimension to obtain a second convolution result; inputting the first convolution result and the second convolution result into a preset classification model to obtain a human behavior category of the video to be recognized.

19 Claims, 9 Drawing Sheets

(51) Int. Cl.
*G06N 3/02* (2006.01)
*G06V 20/40* (2022.01)

(58) Field of Classification Search
USPC .......................................................... 382/181
See application file for complete search history.

(56) References Cited

U.S. PATENT DOCUMENTS

| | | | |
|---|---|---|---|
| 2009/0226047 A1* | 9/2009 | Yu | G06V 40/165 |
| | | | 382/118 |
| 2015/0278590 A1* | 10/2015 | An | G06N 20/10 |
| | | | 382/118 |
| 2018/0204111 A1* | 7/2018 | Zadeh | G06N 3/0436 |
| 2020/0193148 A1* | 6/2020 | He | G06F 3/0304 |
| 2021/0209388 A1* | 7/2021 | Ciftci | G06V 40/45 |
| 2021/0216780 A1* | 7/2021 | Barzelay | G06N 3/08 |

* cited by examiner

VIDEO-BASED HUMAN BEHAVIOR RECOGNITION METHOD, APPARATUS, DEVICE AND STORAGE MEDIUM

CROSS-REFERENCE TO RELATED APPLICATION

This application claims priority to Chinese Patent Application No. 202010025983.X, filed on Jan. 10, 2020, which is hereby incorporated by reference in its entirety.

TECHNICAL FIELD

The present application relates to human recognition technologies in the field of image processing technologies, and in particular, to a video-based human behavior recognition method, apparatus, device, and storage medium.

BACKGROUND

With the development of video and image technologies, a human object in a video can be detected, and then a behavior type of the human object can be determined, thereby determining whether an unsafe behavior is being performed.

In the prior art, when using video technologies to analyze the behavior type of the human object, the behavior of the human object in the video can be determined based on the features of the human object in a certain frame.

However, in the prior art, the behavior of the human object in the video is confirmed only based on the human object features in one frame before the behavior type of the human object in the video is obtained. Since the semantics represented by the same action can be different in different scenarios, the existing methods are not accurate and cannot accurately recognize the behavior type of the human in a video.

SUMMARY

The present application provides a video-based human behavior recognition method, apparatus, device, and storage medium, which can reduce deviations in video interpretation, and improve the accuracy and recall rate of a human behavior category of a video.

In a first aspect, an embodiment of the present application provides a video-based human behavior recognition method, including:

acquiring a video to be recognized, wherein the video to be recognized includes multiple video frames;

acquiring a human rectangle of each video frame of the video to be recognized, where each human rectangle includes a plurality of human key points, and each of the human key points has a key point feature;

constructing a feature matrix according to the human rectangle of the each video frame, where the feature matrix includes the key point feature of each of the human key points, a video frame quantity of the video frames in the video to be recognized, a key point quantity of the human key points in each human rectangle, and a human rectangle quantity of human rectangles in each video frame;

convolving the feature matrix with respect to a video frame quantity dimension to obtain a first convolution result, and convolving the feature matrix with respect to a key point quantity dimension to obtain a second convolution result;

inputting the first convolution result and the second convolution result into a preset classification model to obtain a human behavior category of the video to be recognized.

In this embodiment, the human object is analyzed based on the human rectangle and the human key points of the human object of the adjacent video frames, that is, the analysis is performed with respect to the time dimension, thereby considering the relationship between the video frames of the front and rear frames, and thus the deviation in video interpretation can be reduced, and the accuracy and recall rate of a human behavior category of the video can be improved. Moreover, a convolution result is also obtained with respect to the spatial dimension (the dimension of the key point quantity of the human rectangle). Therefore, based on the two convolution results, a relationship between human objects can be further strengthened, and an analysis of the behavior changes of the human objects based on time can be strengthened, and the human behavior category of the video can be obtained more accurately.

In a possible design, the acquiring a video to be recognized includes:

acquiring a video to be processed, and performing a frame extraction process on the video to be processed to obtain the multiple video frames so as to obtain the video to be recognized.

By performing frame extraction on the video to be processed, the frame quantity in the video can be reduced, the amount of calculation can be reduced, and the speed of the recognition of human behavior in the video can be increased.

In a possible design, the acquiring a human rectangle of each video frame of the video to be recognized includes:

inputting the video to be recognized into a single shot multiBox detector network model to obtain each human rectangle in each video frame;

inputting the each human rectangle in the each video frame into a preset recognition model to obtain the human key points in the each human rectangle, wherein the key point quantity of the human key points in the each human rectangle is V, and V=21.

The key point quantity in each human rectangle is 21, which is more than the 18 human key points in the existing art. By increasing the number of human key points, the accuracy of human behavior recognition is enhanced.

In a possible design, the method further includes:

obtaining all human key points in a human rectangle by prediction according to the human key points in the human rectangle, when it is determined that the human object in the human rectangle is obstructed or the key point quantity of the human key points in the human rectangle is not V.

When not all the human key points can be obtained due to the human object being obstructed or due to recognition accuracy, all human key points in the human rectangle are obtained through prediction, ensuring the accuracy in subsequent convolution processing and human behavior recognition.

In a possible design, the obtaining all human key points in the human rectangle by prediction according to the human key points in the human rectangle includes:

determining a human skeleton structure of the human object in the human rectangle according to the human key points in the human rectangle; determining all human key points of the human rectangle according to the human skeleton structure.

When not all of the human key points can be obtained due to the human object being obstructed or due to recognition accuracy, the human skeleton structure is determined according to known human key points; and all of the human key points of the human rectangle are determined according to the human skeleton structure and the known human key points, thus ensuring the accuracy in subsequent convolution processing and human behavior recognition.

In a possible design, the human rectangle quantity in each video frame is M, where M is a positive integer. The M human rectangles are the top M human rectangles with the highest human rectangle confidences in each video frame; and the method further includes:

acquiring key point confidences of the human key points of each human rectangle in each video frame;

performing a weighted summation of the key point confidences of the human key points in each human rectangle to obtain a human rectangle confidence of the each human rectangle.

For the same video to be recognized, the human rectangle quantity in each video frame is adjusted to be consistent to ensure the correctness and accuracy of subsequent convolution processing and recognition processing. In addition, the human rectangles with highest human rectangle confidences are retained, thereby ensuring that the human rectangles are human rectangles of a real person, and ensuring the accuracy of the human behavior recognition.

In a possible design, when a video quantity of the video to be recognized is N, where N is a positive integer, the feature matrix also includes the video quantity. Therefore, when recognizing multiple videos to be recognized, the feature matrix has features of the multiple videos to be recognized, and furthermore, the multiple videos to be recognized can be recognized at the same time.

In a possible design, after obtaining the human behavior category of the video to be recognized, the method further includes:

when it is determined that the human behavior category is a preset category, issuing an alerting message, where the alerting message includes one or more of the following: voice information, text information, lighting information, and box selection information;

and/or, when it is determined that the human behavior category is a preset category, performing preset processing on the video to be recognized, where the preset processing includes one or more of the following: repeated playback processing, deletion processing, and obstruction processing.

Therefore, some of the dangerous, beneficial and altering behavior categories can be preset, and alerting information can be output, so as to facilitate the staff and other users to avoid the dangerous behaviors or watch alerting behaviors.

In a second aspect, an embodiment of the present application provides a video-based human behavior recognition apparatus, including:

a first acquisition unit, configured to acquire a video to be recognized, wherein the video to be recognized includes multiple video frames;

a second acquisition unit, configured to acquire a human rectangle of each video frame of the video to be recognized, where each human rectangle includes a plurality of human key points, and each of the human key points has a key point feature;

a construction unit, configured to construct a feature matrix according to the human rectangle of the each video frame, where the feature matrix includes the key point feature of each of the human key points, a video frame quantity of the video frames in the video to be recognized, a key point quantity of the human key points in each human rectangle, and a human rectangle quantity of the human rectangle in each video frame;

a convolution unit, configured to convolve the feature matrix with respect to a video frame quantity dimension to obtain a first convolution result and convolving the feature matrix with respect to a key point quantity dimension to obtain a second convolution result;

a recognition unit, configured to input the first convolution result and the second convolution result into a preset classification model to obtain a human behavior category of the video to be recognized.

In this embodiment, the human object is analyzed based on the human rectangles and the human key points of the human object of adjacent video frames. That is, the analysis is performed with respect to the time dimension, thereby considering the relationship between the video frames of the front and rear frames, and thus the deviation in video interpretation can be reduced, and the accuracy and recall rate of a human behavior category of the video can be improved. Moreover, a convolution result is also obtained with respect to the spatial dimension (the dimension of the key point quantity of the human rectangle). Therefore, based on the two convolution results, the relationship between the human objects can be further strengthened, and the analysis of the behavior changes of the human objects based on time can be strengthened, and the human behavior category of the video can be obtained more accurately.

In a possible design, the first acquisition unit is specifically configured to:

acquire a video to be processed, and perform a frame extraction process on the video to be processed to obtain the multiple video frames so as to obtain the video to be recognized.

Performing frame extraction on the video to be processed can reduce the frame quantity in the video, reduce the amount of calculation, and speed up the recognition of human behavior in the video.

In a possible design, the second acquisition unit includes:

a first recognition module, configured to input the video to be recognized into a single shot multiBox detector network model to obtain each human rectangle in each video frame;

a second recognition module, configured to input each human rectangle in the each video frame into a preset recognition model to obtain the human key points in the each human rectangle, where the key point quantity of the human key points in the each human rectangle is V, and V=21.

The key point quantity in each human rectangle is 21, which is more than the 18 human key points in the existing art. By increasing the number of human key points, the accuracy of human behavior recognition is increased.

In a possible design, the apparatus further includes:

a prediction unit, configured to obtain all human key points in the human rectangle by prediction according to the human key points in the human rectangle, when it is determined that the human object in the human rectangle is obstructed or the key point quantity of the human key points in the human rectangle is not V.

When all the human key points cannot be obtained due to the human object is obstructed or a recognition accuracy issue, prediction will be performed to obtain all human key points in the human rectangle, thus ensuring the accuracy of subsequent convolution processing and human behavior recognition.

In a possible design, the prediction unit is specifically configured to:

determine a human skeleton structure of the human object in the human rectangle according to the human key points in the human rectangle; determine all the human key points of the human rectangle according to the human skeleton structure.

When not all of the human key points can be obtained due to the human object is obstructed or a recognition accuracy issue, the human skeleton structure is determined according to known human key points; and all human key points of the human rectangle are determined according to the human skeleton structure and the known human key points, thus ensuring the accuracy of subsequent convolution processing and human behavior recognition.

In a possible design, the human rectangle quantity in each video frame is M, where M is a positive integer; and the M human rectangles are top M human rectangles with the highest human rectangle confidences in each video frame; and the apparatus further includes:

a third acquisition unit, configured to acquire key point confidences of the human key points of each human rectangle in each video frame; perform a weighted summation of the key point confidences of the human key points in each human rectangle to obtain a human rectangle confidence of the each human rectangle.

For the same video to be recognized, the human rectangle quantities in all video frames are adjusted to be consistent to ensure the correctness and accuracy of subsequent convolution processing and recognition processing. In addition, since the human rectangles with highest human rectangle confidences are retained, the human rectangles can be ensured to be human rectangles of a real person, thus ensuring the accuracy of the human behavior.

In a possible design, when the video quantity of video to be recognized is N, N is a positive integer, and the feature matrix also includes the video quantity. Therefore, when recognizing multiple videos to be recognized, the feature matrix has features of multiple videos to be recognized, and furthermore, multiple videos to be recognized can be recognized at the same time.

In a possible design, the apparatus further includes:

an alerting unit, configured to, after the recognition unit obtains the human behavior category of the video to be recognized, and when it is determined that the human behavior category is a preset category, issue an alerting message, where the alerting message includes one or more of the following: voice information, text information, light information, and box selection information;

and/or, a processing unit, configured to, after the recognition unit obtains the human behavior category of the video to be recognized, and when it is determined that the human behavior category is a preset category, perform preset processing on the video to be recognized, where the preset processing includes one or more of the following: repeated playback processing, deletion processing, and obstruction processing.

Therefore, some dangerous, beneficial, and alerting behavior categories can be preset, and alerting information can be output, so as to facilitate the staff and other users to avoid dangerous behaviors or watch alerting behaviors.

In a third aspect, the present application provides a video-based human behavior recognition method, including:

acquiring a video to be recognized, where the video to be recognized includes multiple video frames;

acquiring human features of each video frame of the video to be recognized;

determining a human behavior category of the video to be recognized according to the human features of adjacent video frames.

In this embodiment, performing the analysis with respect to the time dimension can consider the relationship between the video frames of front and rear frames, thus the deviation in video interpretation can be reduced, and the accuracy and recall rate of a human behavior category of the video can be improved. Moreover, a convolution result is also obtained with respect to the spatial dimension. Therefore, based on the two convolution results, the relationship between the human objects can be further strengthened, and the analysis of the behavior changes of the human objects based on time can be strengthened, and the human behavior category of the video can be obtained more accurately.

In a fourth aspect, the present application provides an electronic device, including: a processor and a memory; the memory stores thereon processor executable instructions, where the processor is configured to execute the video-based human behavior recognition method according to any one of the first aspect or execute the video-based human behavior recognition method as described in the third aspect.

In a fifth aspect, the present application provides a computer-readable storage medium on which a computer program is stored. When the program is executed by a processor, the video-based human behavior recognition method described in any one of the first aspects is implemented, or the video-based human behavior recognition method as described in the third aspect is executed.

In a sixth aspect, an embodiment of the present application provides a program product, and the program product includes: a computer program stored in a readable storage medium. At least one processor of a server can read the computer program from the readable storage medium. The at least one processor executes the computer program to cause the server to execute the video-based human behavior recognition method described in any one of the first aspect, or execute the video-based human behavior recognition method as described in any one of the third aspect.

An embodiment of this application as described hereinabove has the following advantages or beneficial effects: the human object could be analyzed based on the human rectangles and the human key points of the human object of the adjacent video frames. That is, performing the analysis with respect to the time dimension, thereby by considering the relationship between the video frames of the front and rear frames, and thus the deviation in video interpretation can be reduced, and the accuracy and recall rate of the human behavior category of the video can be improved. Moreover, a convolution result is also obtained with respect to the spatial dimension (the dimension of the key point quantity of the human rectangle). Therefore, based on the two convolution results, the relationship between the human objects can be further strengthened, and the analysis of the behavior changes of the human objects based on time can be strengthened, and the human behavior category of the video can be obtained more accurately.

Other effects of the above-mentioned optional manners will be described below in combination with specific embodiments.

BRIEF DESCRIPTION OF DRAWINGS

The drawings are used to facilitate better understanding of the solution and do not constitute any limitation on the application. In the drawings.

DESCRIPTION OF EMBODIMENTS

Figure 1:
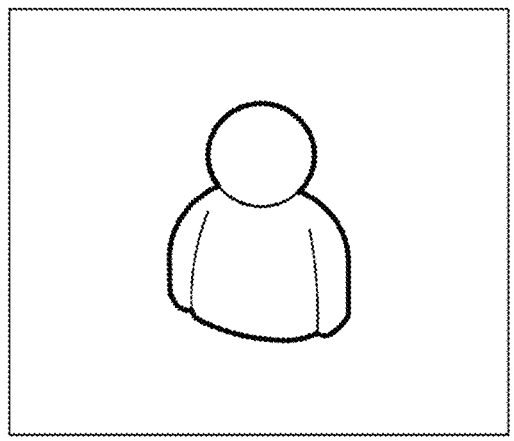
FIG. 1 is an application scenario diagram that can implement the embodiments of the present application.

The following describes exemplary embodiments of the present application with reference to the accompanying drawings, which include various details of the embodiments of the present application to facilitate interpretation, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

With the development of video and image technology, a human object in a video can be detected, and then a behavior type of a human object can be determined, thereby determining whether an unsafe behavior is being performed. In various public places, such as schools, prisons, railway stations, subways, etc., human behavior can be detected and recognized for safeguarding social stability and personnel safety, thereby detecting unsafe behaviors such as assaulting, brawling, burglary, pick-pocketing, robbery, vandalism, possession of blade, and self-immolation.

In an example, videos can be obtained based on a camera; and then information such as human facial expressions, gestures, postures, and key points can be obtained through these videos and constitute an important element of the human analysis technologies. Then, those pieces of information are analyzed to obtain the behavior type.

In an example, a video-level name is output according to a feature of a certain picture frame in a queried video, and then the feature of the picture frame is used as the feature of the video to obtain the behavior type of the human in the video. This is a method based on a picture-level classification model to recognize human behavior in videos. However, in the surveillance scene, the recognition outcome of the picture-level classification model is very poor because there are interferences and uncertainties introduced by various factors in the video information collected by the camera, where the various factors could be such as the camera's angle of view, the distance between the camera and the human object, obstruction of view, and illumination. In addition, the picture-level classification model is also poor in robustness; and the picture-level classification model does not consider the relationship between front and rear frames. That is, the time dimension information is not included, which will cause deviations in the interpretation of the video content, resulting in low recognition accuracy and a low recall rate.

In an example, the features of video content can be classified to obtain a human behavior of the video. However, this method does not take into account the attributes of the human, which has great disadvantages in the scene of distinguishing people. Therefore, in a scene with a large number of people, the human behavior in the video cannot be recognized accurately.

In an example, a title of a video or some attributes of the video can be queried to obtain the result of the video name, which is then used as the behavior type of the human in the video.

In an example, when using video technologies to analyze the behavior type of a human object, a heat map and a human pose estimation method can be used to extract the bone points of the human objects on each frame. Then, the movement of the human object is assessed according to the coordinates of the bone points; and the behavior type of the human object on the current frame is determined. Then, for a video, a voting method is adopted, and the behavior type of the human object with the highest vote is used as the behavior type of the video. However, this method only determines the behavior type of the human object in the current frame based on the bone points of the human object in a single frame, and then uses the behavior type of the human object in this one frame as the behavior type of the human object in the video. However, the semantics represented by the same action can be different in different scenarios. Hence, when a method determines the behavior type of the human object only by the coordinates of the bone points on one frame and using the behavior type of the human object with the highest vote of the behavior type as the behavior type of the video, the method will not be accurate, and cannot accurately recognize the type of human behavior in the video.

It can be seen that, in the above methods, the behavior of a human object in a video is confirmed only based on the human object features in one frame, and then the behavior type of the human object in the video is obtained. Since the semantics represented by the same action can be different in different scenes, the existing methods are not accurate and cannot accurately recognize the behavior type of the human in a video.

In addition, there may be a lot of human objects and tasks that need to be processed in a real scene, which in turn will cause a huge consumption of computing resources, further aggravating the inaccuracy in human behavior recognition.

Instead, this application provides a video-based human behavior recognition method, apparatus, device and storage medium to solve the aforementioned problems.

FIG. 1 is an application scenario diagram that can implement the embodiments of the present application. The solution provided by the embodiment of the present application can be used to recognize a human behavior in a video, and recognize the type of human behavior in the video.

Figure 2:
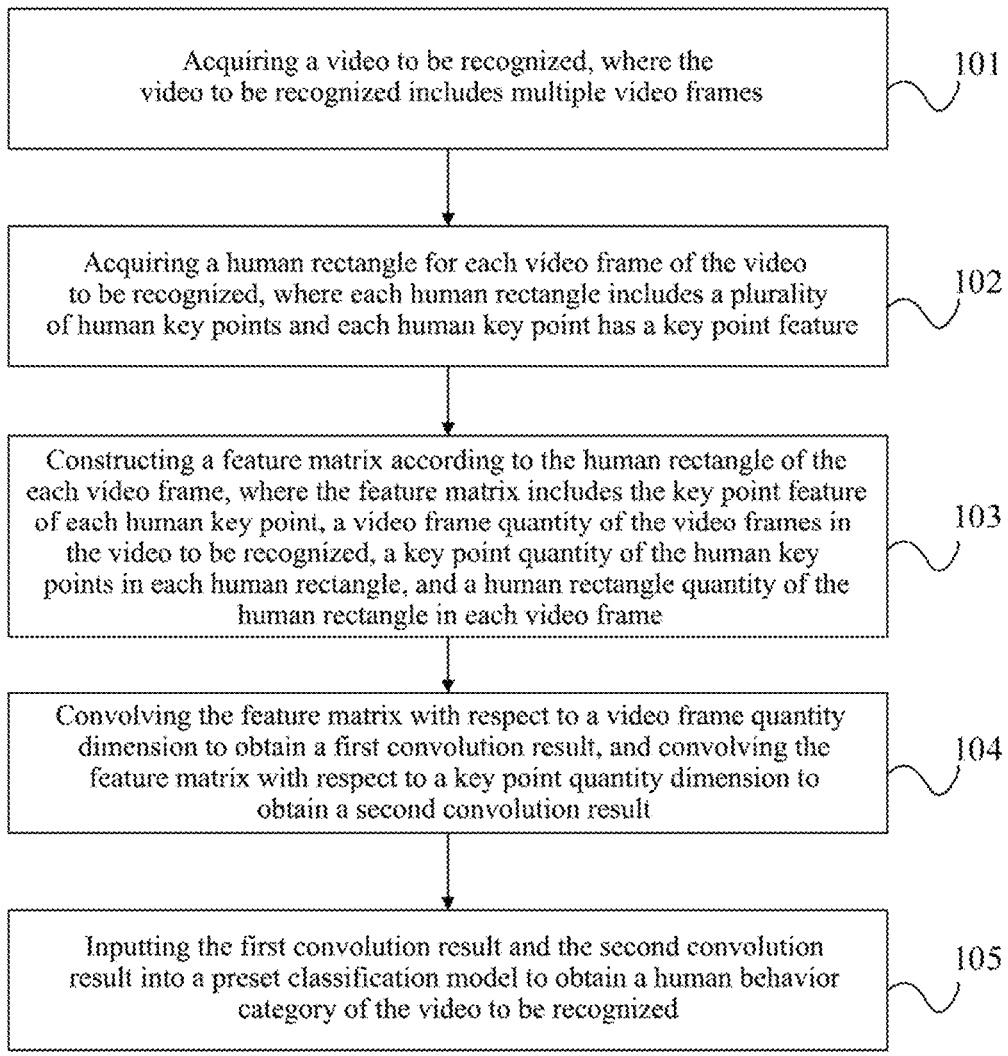
FIG. 2 is a schematic diagram according to a first embodiment of the present application.

FIG. 2 is a schematic diagram according to a first embodiment of the present application. As shown in FIG. 2, the method includes:

S101. Acquiring a video to be recognized, where the video to be recognized includes multiple video frames.

Exemplarily, the executive entity of this embodiment may be a control device, or a terminal device, or a remote server, or other apparatus or devices that can execute the method of this embodiment. In this embodiment, a control device is used as the executive entity for the purpose of description.

A camera is arranged in an environment where human behavior is to be recognized, and the camera can be a high-definition camera. The camera is connected with a control device, and is capable of capturing a video. The control device can acquire the video captured by the camera, and then analyze the video. That is, the control device uses the method provided in this embodiment to analyze the video to obtain the behavior type of the video.

The control device acquires a video to be recognized collected by the camera, where the video to be recognized is composed of multiple video frames.

S102. Acquiring a human rectangle for each video frame of the video to be recognized, where each human rectangle includes a plurality of human key points and each human key point has a key point feature.

Exemplarily, the control device may input the video to be recognized into a preset network model to obtain a human rectangle from each video frame of the video to be recognized. Each video frame has one or more human rectangles, and some video frames may have no human rectangle at all.

In a human rectangle, the human can be marked in the video frame. In order to facilitate subsequent recognition, the network model may mark the human key points in each human rectangle. For example, an open pose algorithm can be used to obtain the human key points in the human rectangles.

Moreover, every human key point has a key point feature. For example, the human key point is the nose, and the human key point has the coordinate information of the nose in the video frame. That is, the key point feature is the coordinate information of the nose in the video frame.

In an example, the control device acquires the video collected by the camera. The control device uses a preset network model to analyze each video frame in the video to obtain a human rectangle from each video frame, and each human rectangle marks a human object in the video frame; and the control device then uses the preset network model to recognize the key points in each human rectangle of each video frame. For example, the open pose algorithm can be used to recognize the human key points in each human rectangle, and each human key point has coordinate information in the video frame.

For example, the control device can obtain human rectangle A and human rectangle B in video frame 1. The human rectangle A has multiple human key points, and the human rectangle B has multiple human key points; and the control device can obtain the human rectangle A, the human rectangle B, and the human rectangle C in the video frame 2 following the video frame 1. The human rectangle A has therein multiple human key points, the human rectangle B has therein multiple human key points, and the human rectangle C has therein multiple human key points.

S103. Constructing a feature matrix according to the human rectangle of the each video frame, where the feature matrix includes the key point feature of each human key point, a video frame quantity of the video frames in the video to be recognized, a key point quantity of the human key points in each human rectangle, and a human rectangle quantity of the human rectangle in each video frame.

Exemplarily, based on the key point feature of each key point of each human rectangle in each video frame in the video to be recognized, the video frame quantity in the video to be recognized, and the key point quantity of each human rectangle and the human rectangle quantity in each video frame, the control device constructs a feature matrix, so that the aforementioned information is included in the feature matrix.

In an example, when collectively recognizing multiple videos to be recognized, the video quantity of the videos to be recognized can also be added to the feature matrix.

For example, for each video to be recognized, the feature matrix (C, T, V, M) of each video to be recognized is obtained. As used herein, C is a three-dimensional matrix, and each element in the three-dimensional matrix C represents a key point feature of a human key point; T is the video frame quantity in the video to be recognized. For example, T=300. V is the key point quantity in each human rectangle. For example, V=18 or 21. M is the human rectangle quantity in each video frame. For example, M=3. In this instance, the feature matrix (C, T, V, M) is a four-dimensional matrix.

For another example, for N videos to be recognized, a feature matrix (N, C, T, V, M) can be obtained. As used herein, N is the video quantity of videos to be recognized. For example, N=180. C is a three-dimensional matrix, and each element in the three-dimensional matrix C represents a key point feature of a human key point. T is the video frame quantity in the video to be recognized. For example, T=300. V is the key point quantity in each human rectangle. For example, V=18 or 21. M is the human rectangle quantity in each video frame. For example, M=3. In this instance, the feature matrix (N, C, T, V, M) is a five-dimensional matrix. For each video to be recognized, the value of the video frame quantity T in the video to be recognized is the same. For each human rectangle, the value of the key point quantity V of the human rectangle is the same. For each video frame, the value of the human rectangle quantity M of in the video frame is the same.

S104. Convolving the feature matrix with respect to a video frame quantity dimension to obtain a first convolution result, and convolving the feature matrix with respect to a key point quantity dimension to obtain a second convolution result.

Exemplarily, for each video to be recognized, the above feature matrix (C, T, V, M) can be obtained. In order to analyze each human object in the video in the time dimension, the network model can be used to convolve the feature matrix obtained in step S103 in the dimension of the video frame quantity to obtain the first convolution result which represents the features of each human object in the video to be recognized in the time dimension. In addition, in order to obtain the relationship between the human rectangles of each human object and the position relationship between the human key points in each human object, the network model can be used to convolve the feature matrix obtained in step S103 in the dimension of the key point quantity to obtain a second convolution result which represents the relationship between the human rectangles of each human object and the position relationship between the human key points in each human object.

The network model can be any kind of neural network model.

For each of N videos to be recognized, the above feature matrix (N, C, T, V, M) can be obtained. Similarly, the network model can be used to convolve the feature matrix (N, C, T, V, M). In the convolution process, the convolution processing in the aforementioned two dimensions may be performed for each video to be recognized to obtain the first convolution result and the second convolution result for each video to be recognized.

S105. Inputting the first convolution result and the second convolution result into a preset classification model to obtain a human behavior category of the video to be recognized.

Exemplarily, for each video to be recognized, the control device inputs the first convolution result and the second convolution result of each video to be recognized into the preset classification model. The classification model is used to perform feature analysis on the convolution results in the above two dimensions, and output the human behavior category of each video to be recognized. The classification model can be any kind of neural network model.

For example, the human behavior category may be sit-down protest type, possession of blade type, burglary & pick-pocketing type, robbery & vandalism type, gang fighting type, brawling type, etc.

This embodiment acquires a video to be recognized which includes multiple video frames, acquires a human rectangle for each video frame of the video to be recognized, where each human rectangle includes a plurality of human key points, and each human key point has a key point feature, constructs a feature matrix according to the human rectangle of the each video frame, where the feature matrix includes the key point feature of each human key point, a video frame quantity of the video frames in the video to be recognized, a key point quantity of the human key points in each human rectangle, and a human rectangle quantity of the human rectangle in each video frame, convolves the feature matrix with respect to a video frame quantity dimension to obtain a first convolution result, and convolves the feature matrix with respect to a key point quantity dimension to obtain a second convolution result, inputs the first convolution result and the second convolution result into a preset classification model to obtain a human behavior category of the video to be recognized. For each video to be recognized, the human rectangle in every video frame in each video to be recognized can be obtained, and the human rectangle is the human rectangle of the human object. In addition, the human key points of the human object in each human rectangle can be obtained. Furthermore, the feature matrix composed of the key point features and the human rectangles is subjected to convolution processing in the time dimension (the dimension of the video frame quantity of the video to be recognized) and the spatial dimension (the dimension of the key point quantity of the human rectangle), respectively, to obtain a first convolution result and a second convolution result. The first convolution result represents the features of each human object in the video to be recognized in the time dimension, and the second convolution result represents the relationship between the human rectangles of each human object and the position relationship between the human key points in each human object. Furthermore, the human behavior is recognized based on the above convolution results and the human behavior category of the video to be recognized is obtained. Since a human rectangle and human key points of the human object in each video frame in the video can be obtained, the human object can be analyzed based on the human rectangle and human key points of the human object of adjacent video frames. That is, by performing the analysis in the time dimension, the relationship between a previous and a next video frame can be considered, the deviation in video interpretation can be reduced, and the accuracy and recall rate of a human behavior category of the video can be improved. Moreover, the convolution result is also obtained with respect to the spatial dimension (the dimension of the key point quantity of the human rectangle). In addition, the convolution result represents the relationship between the human rectangles of each human object and the position relationship between the human key points in each human object. Therefore, based on the two convolution results, the relationship between the human objects can be further strengthened, and the analysis of the behavior changes of the human objects based on time can be strengthened, and the human behavior category of the video can be obtained more accurately.

Figure 3:
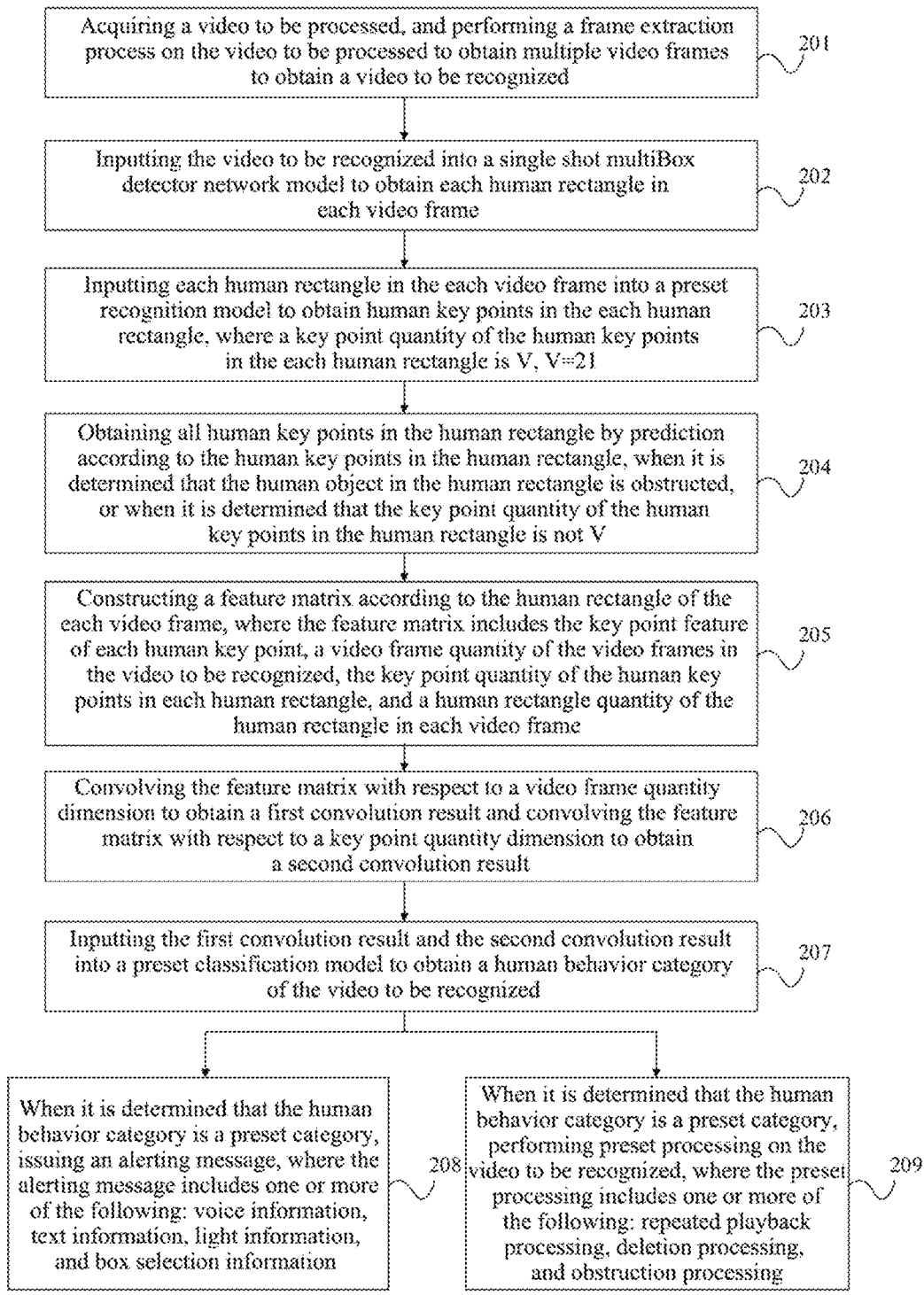
FIG. 3 is a schematic diagram according to a second embodiment of the present application.

FIG. 3 is a schematic diagram according to a second embodiment of the present application. As shown in FIG. 3, the method includes the following.

S201. Acquiring a video to be processed, and performing a frame extraction process on the video to be processed to obtain multiple video frames to obtain a video to be recognized.

Exemplarily, the execution subject of this embodiment may be a control device, or a terminal device, or a remote server, or other apparatus or devices that can execute the method of this embodiment. In this embodiment, a control device is used as the executive entity for the purpose of description.

A camera is arranged in an environment where human behavior is to be recognized, and the cameras can be a high-definition camera. The camera is connected with the control device, and is capable of capturing a video. The control device can acquire the video captured by the camera, and then analyze the video. That is, the control device uses the method provided in this embodiment to analyze the video to obtain the behavior type of the video.

The control device obtains the video collected by the camera. In this instance, the video includes multiple frames of images, and the video is an unprocessed video. In order to reduce the amount of calculation and increase the speed at which the control device recognizes the human behavior in the video, the video collected by the camera can be sampled to reduce the frame quantity in the video. The control device can perform a frame extraction process on the video collected by the camera, and then extract multiple video frames from the video to construct the video to be recognized from the multiple video frames.

In an example, the control device uniformly samples the images in the video collected by the camera to obtain multiple video frames. In an example, the control device may use the open source tool FFMPEG to perform a frame extraction process on the video.

S202. Inputting the video to be recognized into a single shot multiBox detector network model to obtain each human rectangle in each video frame.

Figure 4:
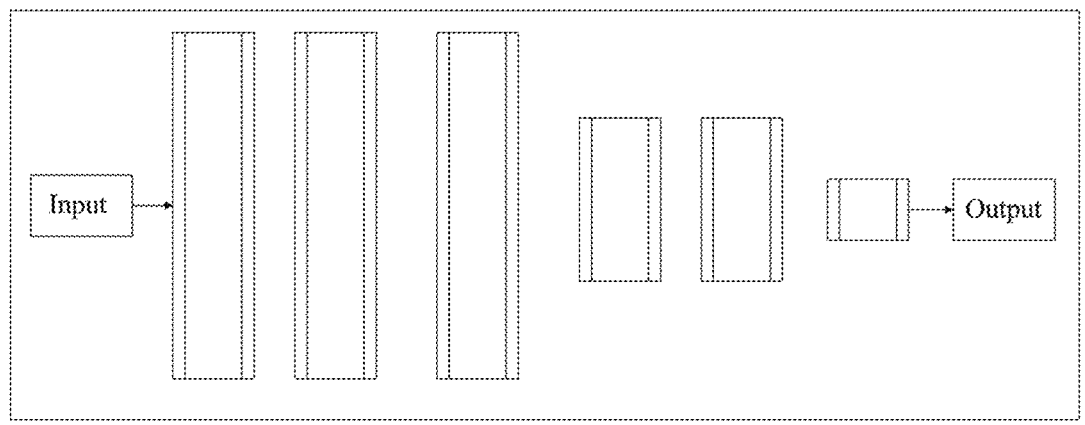
FIG. 4 is a schematic diagram of an SSD network model according to an embodiment of the present application.

Exemplarily, the control device can input the video to be recognized into a single shot multiBox detector (SSD) network model, where the SSD network model has been trained to mark the image of the human rectangle, and the SSD network model can recognize the human object in the video frame of the video and mark the human object in the video frame, that is, mark the human object with a human rectangle. FIG. 4 is a schematic diagram that can implement an SSD network model according to the embodiment of the present application. As shown in FIG. 4, the SSD network model has a multi-layer structure; and the open source tool PaddlePaddle can be used to train the SSD network model.

Figure 5:
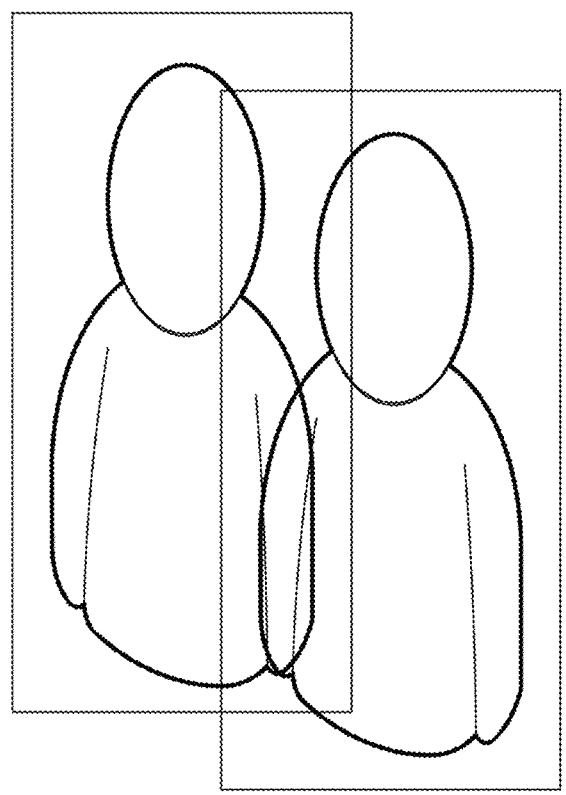
FIG. 5 is a first schematic diagram of a human rectangle according to an embodiment of the present application.

Therefore, FIG. 5 is a first schematic diagram that can implement a human rectangle according to the embodiment of the present application. As shown in FIG. 5, the control device can obtain the human rectangle of each human object in each video frame. It can be seen that a human rectangle is marked for each human object. Each human rectangle has four corner points.

Moreover, when the SSD network model outputs the human rectangle of the human object of each video frame, it will attribute each human rectangle with a confidence. That is, the confidence as used herein is the confidence given to the human rectangle by the SSD network model, and the value of the confidence is greater than a preset threshold, for example, greater than 0.4.

S203. Inputting each human rectangle in the each video frame into a preset recognition model to obtain human key points in the each human rectangle, where a key point quantity of the human key points in the each human rectangle is V, V=21.

Exemplarily, after obtaining the human rectangle of the human object in each video frame, the control device needs to determine the human key points of the human object in each video frame.

The control device inputs each human rectangle in each video frame into the preset recognition model. The recognition model can be a neural network model that has been trained using images and videos in which human key points have been pre-marked. Therefore, the recognition model can recognize the human key points of the human object in each human rectangle. In addition, the recognition model can output the key point confidence for each human key point, and the key point confidence represents the probability that the human key point is determined to be a real human key point.

Figure 6:
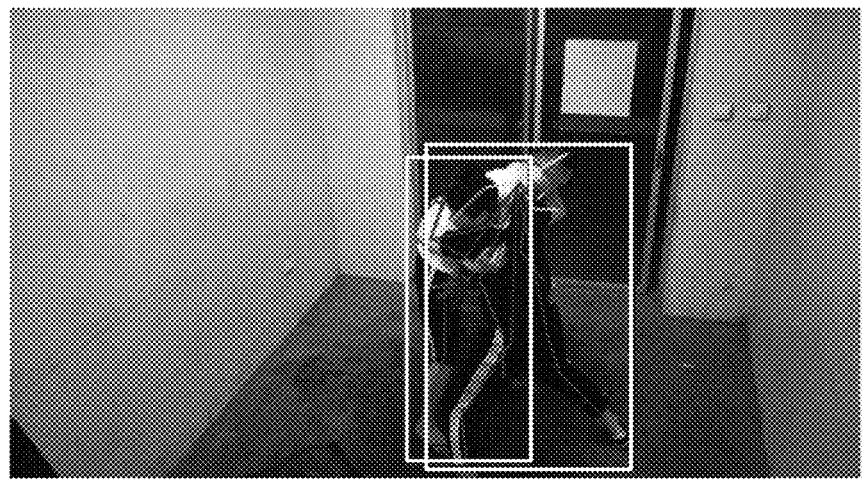
FIG. 6 is a second schematic diagram of a human rectangle according to an embodiment of the present application.
Figure 7:
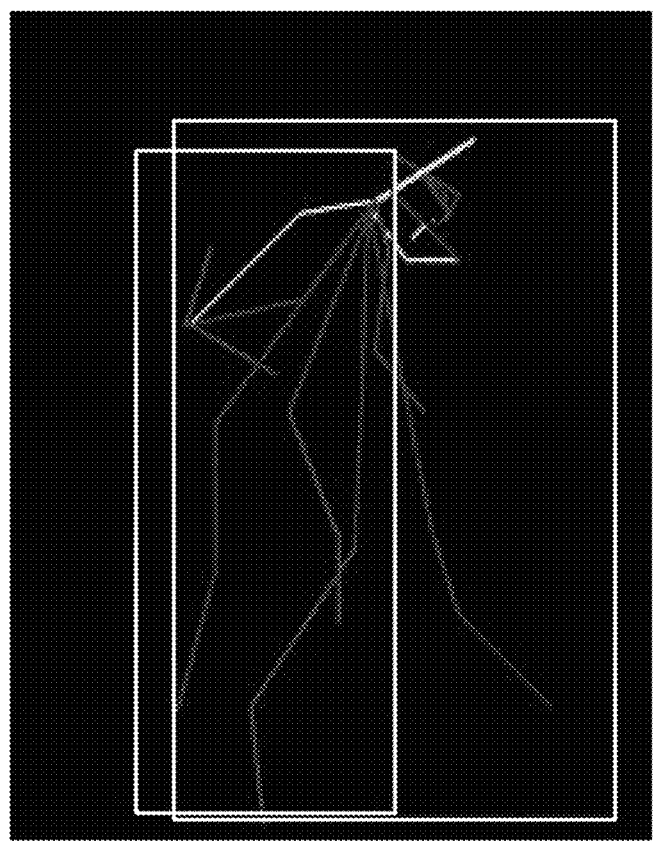
FIG. 7 is a third schematic diagram of a human rectangle according to an embodiment of the present application.

In this embodiment, for the purpose of increasing the recognition accuracy of human behavior, the quantity of human key points may be increased. When the open pose algorithm is used to recognize the human key points, 18 key points can be obtained for each human object. However, in this embodiment, for each human object, 21 key points can be obtained. FIG. 6 is a second schematic diagram that can implement a human rectangle according to an embodiment of the present application. FIG. 7 is a third schematic diagram that can implement a human rectangle according to an embodiment of the present application. As shown in FIGS. 6 and 7, the control device can obtain the human rectangle of each human object in each video frame, and obtain the human key points of each human object. For each human object, the human key points can be joined.

Figure 8:
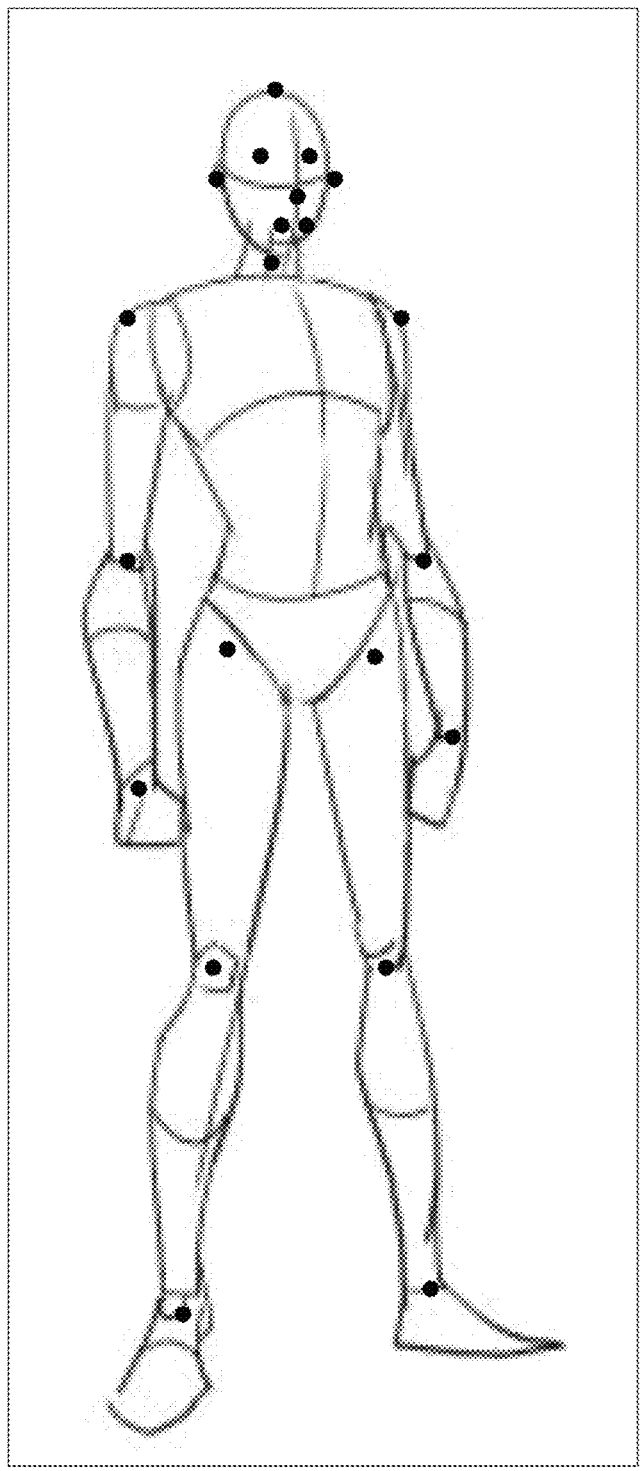
FIG. 8 is a schematic diagram of human key points according to an embodiment of the present application.

FIG. 8 is a schematic diagram that can implement human key points according to an embodiment of the present application. As shown in FIG. 8, 21 human key points can be obtained for each human object. The 21 human key points in each human rectangle are nose {0, "nose"}, left eye {1, "left_eye"}, right eye {2, "right_eye"}, left ear {3, "left_ear" }, right ear {4, "right_ear"}, left shoulder {5, "left_shoulder"}, right shoulder {6, "right_shoulder"}, left elbow {7, "left_elbow"}, right elbow {8, "right_elbow"}, left wrist {9, "left_wrist"}, right wrist {10, "right_wrist"}, left hip {11, "left_hip"}, right hip {12, "right_hip"}, left knee {13, "left_knee"}, right knee {14, "right_knee"}, left ankle {15, "left_ankle"}, right ankle {16, "right_ankle"}, top of head {17, "top_head"}, neck {18, "neck"}, left mouth corner {19, "left_mouth_corner"}, right mouth corner {20, "right_mouth_corner"}.

S204. Obtaining all human key points in a human rectangle by prediction according to the human key points in the human rectangle, when it is determined that the human object in the human rectangle is obstructed, or when it is determined that the key point quantity of the human key points in the human rectangle is not V.

In an example, step S204 specifically includes: determining a human skeleton structure of the human object in the human rectangle according to the human key points in the human rectangle; and determining all the human key points of the human rectangle according to the human skeleton structure.

Exemplarily, after the control device obtains the human key points of each human object, there may be some human objects from which not all 21 human key points can be obtained.

In an example, when the preset recognition model in step S203 recognizes the human key points of human objects in each human rectangle, the preset recognition model can recognize which human objects are being obstructed, and for these obstructed human objects, not all 21 human key points can be recognized. In an example, when the preset recognition model in step S203 recognizes the human key points of the human object in each human rectangle, due to the obstruction of the human object or the recognition accuracy problem, not all 21 human key points can be obtained.

Therefore, after step S203, for a human body object for which V=21 human body key is not obtained, that is, a human body frame that does not include 21 human body key points, the control device needs to perform prediction to obtain all the human body key points of the human body frame.

In an example, for a human body object for which V=21 human body key is not obtained, that is, a human body frame that does not include 21 human body key points, when the human rectangle already has a plurality of human key points, the control device may obtain the positions and categories of known human key points of the human rectangle. For example, a human rectangle is marked for a human object in a certain video frame and has 18 human key points, i.e., nose, left eye, left ear, left shoulder, left elbow, right elbow, left wrist, right wrist, left hip, right hip, left knee, right knee, left ankle, right ankle, top of head, neck, left mouth corner, right mouth corner, and the locations of the human key points in each of the above categories have been marked.

Then, the control device can outline a human skeleton structure for the human object in the human rectangle according to the positions and categories of the known human key points. Understandably, the human skeleton structure is incomplete because the human skeleton structure at this time lacks some human key points. Since the positions and categories of the known human key points are already available, the human skeleton structure can be used to recover the absent human key points. For example, by leveraging the symmetry in the human skeleton structure, the unknown human key points can be predicted.

For example, a human rectangle has been marked for a human object in a certain video frame. The human rectangle has 18 human key points, which are nose, left eye, left ear, left shoulder, left elbow, right elbow, left wrist, right wrist, left hip, right hip, left knee, right knee, left ankle, right ankle, top of head, neck, left mouth corner, and right mouth corner. The control device can outline the human skeleton structure of the human object in the human rectangle according to the positions and categories of the 18 human key points. Then, the control device determines the missing human key points, namely the right eye, right ear, and right shoulder. The control device can determine the human key point of "right eye" according to the symmetry principle based on the known structural relationship between the human key point "left eye" and the human skeleton structure. Similarly, the control device can determine the human key point of "right ear" according to the symmetry principle based on the known structural relationship between the human key point "left ear" and the human skeleton structure. The control device can determine the human key point of "right shoulder" according to the symmetry principle based on the known structural relationship between the human key point "left shoulder" and the human skeleton structure.

S205. Constructing a feature matrix according to the human rectangle of the each video frame, where the feature matrix includes the key point feature of each human key point, a video frame quantity of the video frames in the video to be recognized, the key point quantity of the human key points in each human rectangle, and a human rectangle quantity of the human rectangle in each video frame.

In an example, when the video quantity of video to be recognized is N, where N is a positive integer, that is, the feature matrix also includes the video quantity.

In an example, the human rectangle quantity in each video frame is M, where M is a positive integer. The M human rectangles are the top M human rectangles with the highest human rectangle confidence in each video frame. The method provided in this embodiment may also perform the following steps: acquiring the key point confidences of the human key points of each human rectangle in each video frame; and performing a weighted summation of the key point confidences of the human key points in each human rectangle to obtain a human rectangle confidence of the each human rectangle.

Exemplarily, the video frame quantity in the video to be recognized is T, for example, T=300. When multiple videos to be recognized need to be recognized, since each video to be recognized has been subjected to a frame extraction process in step S201, the video frame quantity of each video to be recognized is the same. For example, recognition may be performed on N videos to be recognized, where N=180.

In the above steps, for each video frame in each video to be recognized, the human rectangle of each video frame and the human key points of each human rectangle are recognized, and for the human rectangle that has human key points less than V, prediction is performed to make up to all the V human key points, for example, V=21. Furthermore, the key point quantity of each human rectangle is the same.

Moreover, every human key point has a key point feature. For example, the key point feature is (x, y, score), where x is the coordinate of the human key point on the x axis in the video frame, y is the coordinate of the human key point on the y axis in the video frame, and score is the confidence of the human key point. The key point confidence is the confidence of the human key point output by the recognition model in step S203.

However, in the above steps, when the human rectangle in each video frame is outputted, the human rectangle quantity in each video frame may be different. In order to facilitate subsequent convolution processing, for the same video to be recognized, the human rectangle quantity in each video frame in the video to be recognized needs to be adjusted to be consistent. In this step, for the same video to be recognized, since the recognition model in step S203 outputs the confidences of the human key points, the control device can obtain the key point confidences of the human key points in each human rectangle in each video frame. Then, for each human rectangle of the video to be recognized, the control device performs a weighted summation of the key point confidences of the human key points in each human rectangle according to preset weight values, thereby obtaining the human rectangle confidence of each human rectangle. Then, for each human rectangle of the video to be recognized, the control device selects a number of human rectangles with the highest confidence of the human rectangle, that is, the top M human rectangles, for example, M=1 or M=3. Therefore, the control device adjusts the human rectangle quantity in each video frame in the same video to be recognized to M. Furthermore, the correctness and accuracy of subsequent convolution processing and recognition processing are ensured. In addition, the human rectangle with high human rectangle confidence is retained, thereby ensuring that the human rectangle is a human rectangle of a real person, and ensuring the accuracy of the human behavior recognition.

Therefore, for each video to be recognized, the control device obtains the feature matrix (C, T, V, M) of each video to be recognized based on the above features, where C is a three-dimensional matrix, and each element in the three-dimensional matrix C represents a key point feature of a human key point; T is the video frame quantity in the video to be recognized, for example, T=300; V is the key point quantity in each human rectangle, for example, V=18 or 21; and M is the human rectangle quantity in each video frame, for example, M=1 or M=3.

For N videos to be recognized, a feature matrix (N, C, T, V, M) can be obtained, and the feature matrix (N, C, T, V, M) is a five-dimensional matrix.

S206. Convolving the feature matrix with respect to a video frame quantity dimension to obtain a first convolution result, and convolving the feature matrix with respect to a key point quantity dimension to obtain a second convolution result.

Exemplarily, this step may refer to step S104 shown in FIG. 2, and details are not described again. In this step, a color image (for example, RGB image) can be used as a spatial convolution network, and an optical flow field can be used as a time flow convolution network. That is, the spatial convolution network is used to convolve the feature matrix with respect to the dimension of the video frame quantity to obtain a first convolution result, and the time flow convolution network is used to convolve the feature matrix with respect to the dimension of the key point quantity to obtain the second convolution result.

S207. Inputting the first convolution result and the second convolution result into a preset classification model to obtain a human behavior category of the video to be recognized.

Exemplarily, this step may refer to step S105 shown in FIG. 2, and details are not described again.

After step S207, step S208 and/or step S209 may be executed.

S208. When it is determined that the human behavior category is a preset category, issuing an alerting message, where the alerting message includes one or more of the following: voice information, text information, light information, and box selection information.

Exemplarily, for each video to be recognized, the processing of the above steps may be performed in real time for the video to be recognized, so as to obtain a human behavior category of the video to be recognized. The control device can preset some dangerous behavior categories, such as sit-down protest type, possession of blade type, burglary & pick-pocketing type, robbery & vandalism type, gang fighting type, brawling type, etc. Then, when the control device determines that a human behavior category of the video to be recognized belongs to the preset categories, the control device can issue an alerting message.

For example, the control device may directly issue voice and/or text, and then prompt the staff to deal with the dangerous human behavior and protect other personnel. For example, the control device can emit lights to notify all personnel to avoid dangerous human behavior. For example, the control device can display the video to be recognized, and then box-select the user with a dangerous behavior category on the video to be recognized, so that the staff can handle the user, or facilitate subsequent analysis of the video to be recognized and the action with the dangerous behavior in the video to be recognized.

S209. When it is determined that the human behavior category is a preset category, performing preset processing on the video to be recognized, where the preset processing includes one or more of the following: repeated playback processing, deletion processing, and obstruction processing.

Exemplarily, when a video is played in real time to expand audience to more users, the control device can use the above steps to accomplish the recognition of the human behavior category of the video. In order to prevent some behaviors from causing adverse effects on the public, the control device can process the recognized video after detecting the human behavior category. Here, the control device can preset some misbehavior categories that are not conducive to public viewing, such as nudity type, possession of blade type, bloody & gore type, etc. Then, when the control device determines that a human behavior category of the video to be recognized belongs to these preset categories, the control device can directly process the video to, for example, delete a video frame or a video with the misbehavior category, or perform obstruction processing on a video frame with the misbehavior category.

Or, when a video is played in real time or re-played, the video can have some interesting or alerting contents. In order for the users to watch more of these contents, the control device can process the recognized video after detecting the human behavior category. Here, the control device can preset some beneficial behavior categories or alerting behavior categories that the users can watch repeatedly, for example, theft type, joke type, etc. Then, when the control device determines that the human behavior category of the video to be recognized belongs to the preset categories, the control device can directly process the video, for example, repeatedly playback video frames or videos with the beneficial behavior categories or alerting behavior categories.

In this embodiment, on the basis of the above embodiment, the human object could be analyzed based on the human rectangle and the human key points of the human object of the adjacent video frames. That is, the analysis is performed in the time dimension, thereby considering the relationship between the video frames of the previous and next frames, the deviation in video interpretation can be reduced, and the accuracy and recall rate of a human behavior category of the video can be improved. Moreover, the convolution result is also obtained with respect to the spatial dimension (the dimension of the key point quantity of the human rectangle). Based on the two convolution results, the relationship between the human objects can be further strengthened, and the analysis of the behavior changes of the human objects based on time can be strengthened, and the human behavior category of the video can be obtained more accurately. Therefore, the behavioral actions and action tags of the video are obtained, which is conducive to optimize the convolution model and the recognition model, and help the user and other smart devices to understand the video content. Moreover, based on the spatial convolution network and the time flow convolution network, the feature matrix is convolved, and the human behavior recognition is performed according to the convolution result. Therefore, the deviation in video interpretation can be reduced, and the accuracy and recall rate of the recognition result can be improved. In addition, dangerous, beneficial, and alerting behavior categories can be preset in this embodiment, and alerting information can be output, so as to facilitate the staff and other users to avoid dangerous behaviors or watch the alerting behaviors. In addition, each model used in this embodiment can be trained and simulated by using preset behavior categories and recognition, which can enhance the recognition and classification capabilities without the need for direct bodily detection and motion detection, thereby reducing computational consumption and saving costs. Since the recognition accuracy of the solution provided by this embodiment is relatively high, interference caused by factors such as camera angle of view, distance, lighting, can be reduced, and the accuracy of extracting features such as human rectangles and key points in the video can be effectively improved.

Figure 9:
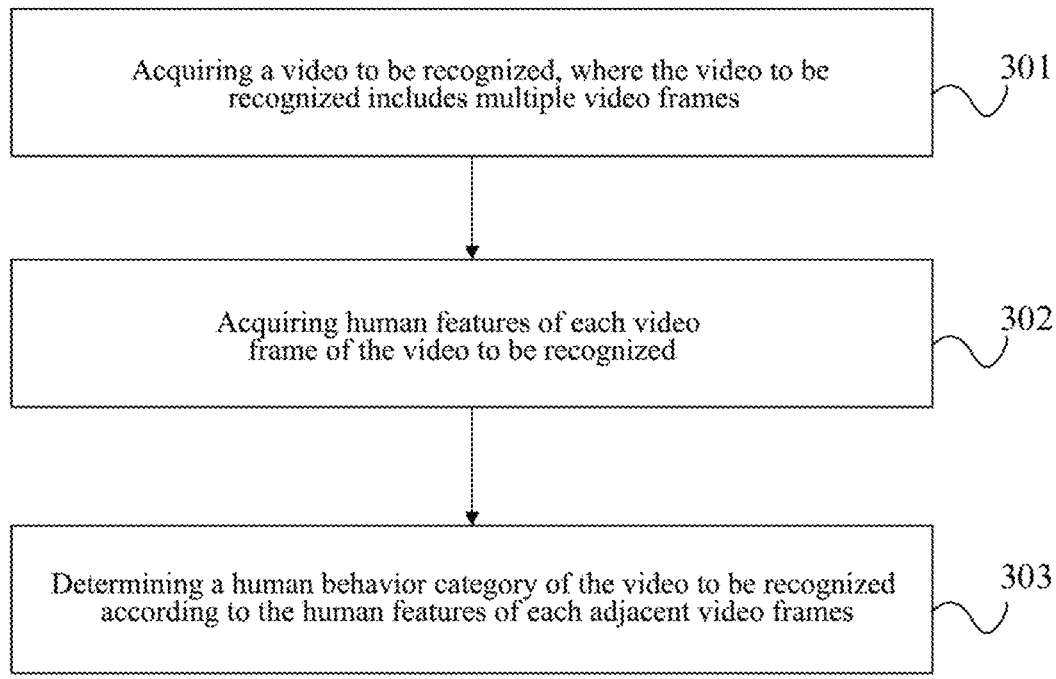
FIG. 9 is a schematic diagram according to a third embodiment of the present application.

FIG. 9 is a schematic diagram according to a third embodiment of the present application. As shown in FIG. 9, the video-based human behavior recognition method provided in this embodiment may include the following.

S301. Acquiring a video to be recognized, where the video to be recognized includes multiple video frames.

Exemplarily, this step may refer to step S101 shown in FIG. 2, and details are not described again.

S302. Acquiring human features of each video frame of the video to be recognized.

Exemplarily, for each video to be recognized, the method of the aforementioned embodiments may be used to obtain the human features of each video frame, and the human features of each video frame includes each human rectangle of each video frame, the human key points of each human rectangle of each video frame, and the key point feature of each human key point, and each video to be recognized includes multiple video frames.

S303. Determining a human behavior category of the video to be recognized according to the human features of each adjacent video frames.

Exemplarily, for each video to be recognized, convolution is performed with respect to the time dimension according to the human features of each adjacent video frames to obtain a first convolution result; convolution is performed with respect to the spatial dimension to obtain a second convolution result. In an example, in order to analyze each human object in the video with respect to the time dimension, convolution can be performed on the human features with respect to the dimension of the video frame quantity by using a network model to obtain the first convolution result. The first convolution result represents the features of each human object in the video to be recognized in the time dimension. In order to obtain the relationship between the human rectangles of each human object and the positional relationship between the human key points in each human object, convolution can be performed on the human features with respect to the dimension of the key point quantity by using a network model to obtain the second convolution result. The second convolution result represents the relationship between the human rectangles of each human object and the position relationship between the human key points in each human object.

Then, for each video to be recognized, the control device inputs the first convolution result and the second convolution result of each video to be recognized into the preset classification model; and the classification model is used to perform feature analysis on the convolution results in the above two dimensions, and then output the human behavior category of each video to be recognized. The classification model can be any kind of neural network model.

In this embodiment, by determining the human behavior category of the video to be recognized according to the human features of each adjacent video frames, the convolution processing is performed with respect to the time dimension (the dimension of the number of video frames of the video to be recognized) and the spatial dimension (the dimension of the number of key points of the human rectangle), respectively, thus considering the relationship between the video frames of the front and rear frames, so that the deviation in video interpretation can be reduced, and the accuracy and recall rate of a human behavior category of the video can be improved. Moreover, the convolution result is also obtained with respect to the spatial dimension (the dimension of the key point quantity of the human rectangle). Therefore, based on the two convolution results, the relationship between the human objects can be further strengthened, and the analysis of the behavior changes of the human objects based on time can be strengthened, and the human behavior category of the video can be obtained more accurately.

Figure 10:
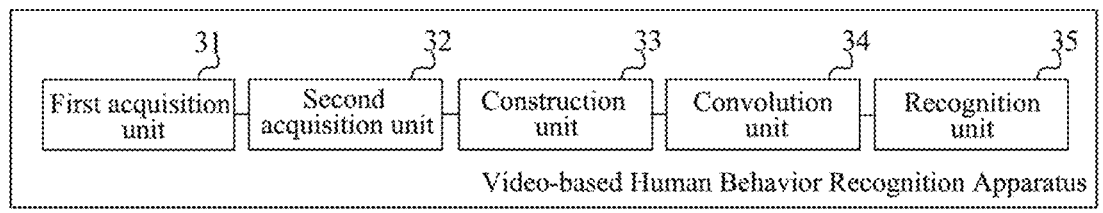
FIG. 10 is a schematic diagram according to a third embodiment of the present application.

FIG. 10 is a schematic diagram according to a third embodiment of the present application. As shown in FIG. 10, the video-based human behavior recognition apparatus provided in this embodiment may include:

a first acquisition unit 31, configured to acquire a video to be recognized, where the video to be recognized includes multiple video frames;

a second acquisition unit 32, configured to acquire a human rectangle of each video frame of the video to be recognized, where each human rectangle includes a plurality of human key points, and each human key point has a key point feature;

a construction unit 33, configured to construct a feature matrix according to the human rectangle of the each video frame, where the feature matrix includes the key point feature of each human key point, a video frame quantity of the video frames in the video to be recognized, a key point quantity of the human key points in each human rectangle, and a human rectangle quantity of the human rectangle in each video frame;

a convolution unit 34, configured to: convolve the feature matrix with respect to a video frame quantity dimension to obtain a first convolution result, and convolve the feature matrix with respect to a key point quantity dimension to obtain a second convolution result;

a recognition unit 35, configured to input the first convolution result and the second convolution result into a preset classification model to obtain a human behavior category of the video to be recognized.

The video-based human behavior recognition apparatus of this embodiment can perform the technical solution in the methods shown in FIG. 2, FIG. 3 and FIG. 9. Reference can be made to FIG. 2, FIG. 3 and FIG. 9 for the specific implementation process and technical principle, which will not be repeated herein.

Figure 11:
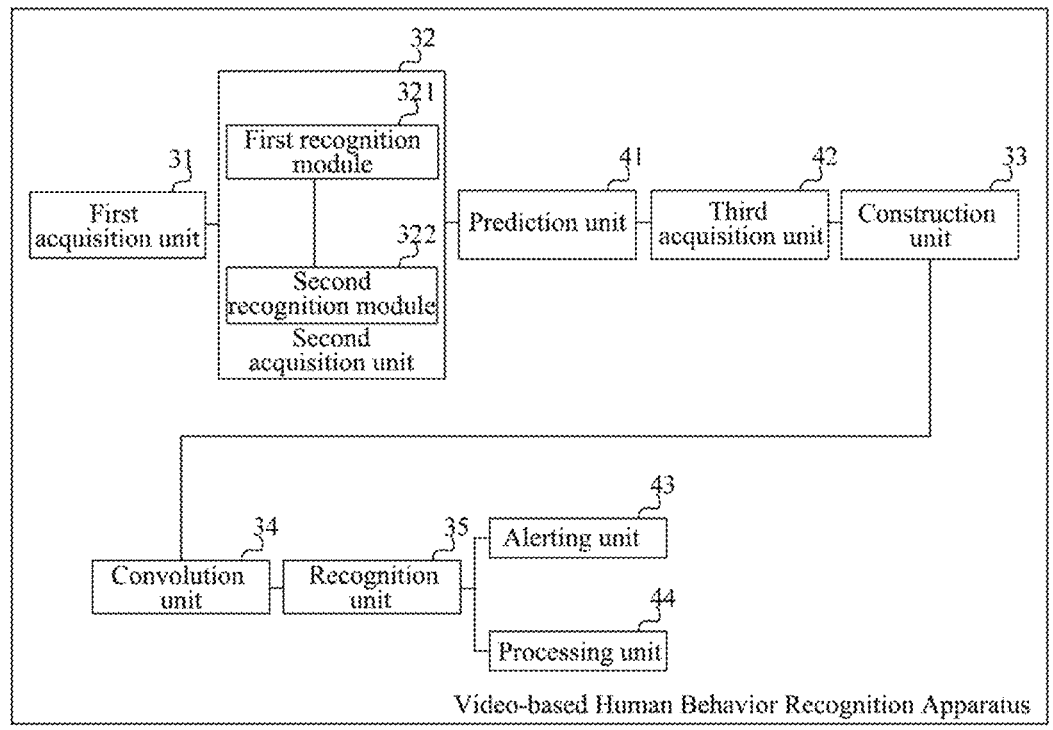
FIG. 11 is a schematic diagram according to a fourth embodiment of the present application.

FIG. 11 is a schematic diagram according to a fourth embodiment of the present application. On the basis of the embodiment shown in FIG. 10, as shown in FIG. 11, in the video-based human behavior recognition apparatus provided in this embodiment, the first acquisition unit 31 is specifically configured to:

acquire a video to be processed, and perform a frame extraction process on the video to be processed to obtain multiple video frames so as to obtain the video to be recognized.

In an example, the second acquisition unit 32 includes:

a first recognition module 321, configured to input the video to be recognized into a single shot multiBox detector network model to obtain each human rectangle in each video frame;

a second recognition module 322, configured to input each human rectangle in the each video frame into a preset recognition model to obtain the human key points in the each human rectangle, where a key point quantity of the human key points in the each human rectangle is V, V=21.

In an example, the apparatus provided in this embodiment further includes:

a prediction unit 41, configured to obtain all human key points in a human rectangle by prediction according to the human key points in the human rectangle when it is determined that the human object in the human rectangle is obstructed or when it is determined that the key point quantity of the human key points in the human rectangle is not V.

In an example, a prediction unit 41 is specifically configured to:

determine a human skeleton structure of the human object in the human rectangle according to the human key points in the human rectangle; and determine all the human key points of the human rectangle according to the human skeleton structure.

In an example, the human rectangle quantity in each video frame is M, where M is a positive integer. The M human rectangles are the top M human rectangles with the highest human rectangle confidences in each video frame. The apparatus provided in this embodiment further includes:

a third acquisition unit 42, configured to acquire key point confidences of the human key points of each human rectangle in each video frame; perform a weighted summation of the key point confidences of the human key points in each human rectangle to obtain a human rectangle confidence of the each human rectangle.

In an example, when a video quantity of video to be recognized is N, where N is a positive integer, the feature matrix also includes the video quantity.

In an example, the apparatus provided in this embodiment further includes:

an alerting unit 43, configured to issue an alerting message after the recognition unit 35 obtains the human behavior category of the video to be recognized and when it is determined that the human behavior category is a preset category, where the alerting message includes one or more of the following: voice information, text information, lighting information, and box selection information;

and/or, a processing unit 44, configured to perform preset processing on the video to be recognized after the recognition unit obtains the human behavior category of the video to be recognized and when it is determined that the human behavior category is a preset category, where the preset processing includes one or more of the following: repeated playback processing, deletion processing, and obstruction processing.

The video-based human behavior recognition apparatus of this embodiment can perform the technical solutions in the methods shown in FIG. 2 and FIG. 3. For the specific implementation process and technical principles, please refer to the relevant descriptions in the methods shown in FIGS. 2 to 3, which will not be repeated herein.

Figure 12:
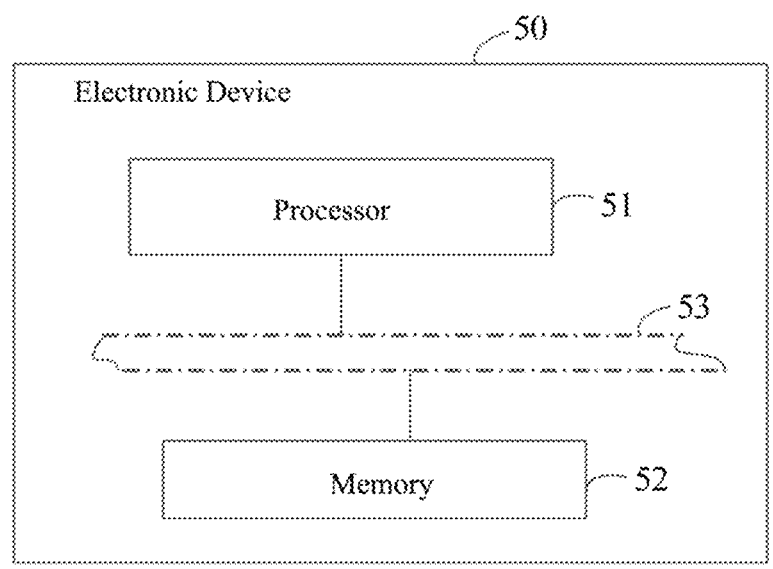
FIG. 12 is a schematic diagram according to a fifth embodiment of the present application.

FIG. 12 is a schematic diagram according to a fifth embodiment of the present application. As shown in FIG. 12, an electronic device 50 in this embodiment may include a processor 51 and a memory 52.

The memory 52 is configured to store programs. The memory 52 may include volatile memory, such as random-access memory (RAM), e.g., static random-access memory (SRAM), double data rate synchronous dynamic random access memory (DDR SDRAM).

The memory may also include non-volatile memory, such as flash memory. The memory 52 is configured to store computer programs (such as application programs and functional modules that implement the foregoing methods), computer instructions, and the foregoing computer programs, computer instructions, may be partitioned and stored in one or more memories 52. In addition, the aforementioned computer programs, computer instructions, data, etc., can be called by the processor 51.

The aforementioned computer programs, computer instructions, etc. may be partitioned and stored in one or more memories 52. In addition, the aforementioned computer programs, computer data, etc. can be called by the processor 51.

The processor 51 is configured to execute a computer program stored in the memory 52 to implement the steps in the method involved in the foregoing embodiments.

For details, refer to the related description in the foregoing method embodiments.

The processor 51 and the memory 52 may be standalone structures or an integrated structure integrated together. When the processor 51 and the memory 52 are standalone structures, the memory 52 and the processor 51 may be coupled and connected via a bus 53.

The electronic device of this embodiment can perform the technical solution in the methods shown in FIG. 2, FIG. 3 and FIG. 9. Reference may be made to FIG. 2, FIG. 3 and FIG. 9 for the specific implementation process and technical principle, which will not be repeated herein.

In this embodiment, by analyzing the human object based on the human rectangles and the human key points of the human object of the adjacent front and rear video frames, that is, by performing the analysis in the time dimension, thereby considering the relationship between the video frames of the front and rear frames, the deviation in video interpretation can be reduced, and the accuracy and recall rate of the human behavior category of the video can be improved. Moreover, a convolution result is also obtained with respect to the spatial dimension (the dimension of the key point quantity of the human rectangle). Based on two convolution results, the relationship between the human objects can be further strengthened, and the analysis of the behavior changes of the human objects based on time can be strengthened, and the human behavior category of the video can be obtained more accurately. Therefore, the behavioral actions and action tags of the video are obtained, which is conducive to optimize the convolution model and the recognition model and help the user and other smart devices to interpret the video content.

According to the embodiments of the present application, the present application also provides an electronic device and a readable storage medium.

Figure 13:
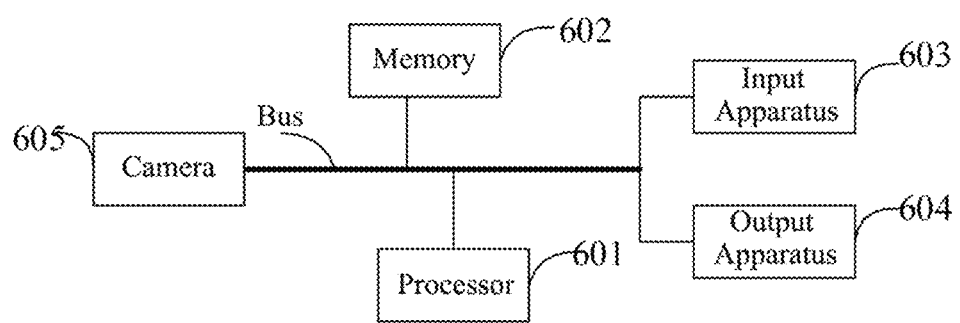
FIG. 13 is a block diagram of an electronic device used to implement a video-based human behavior recognition method according to an embodiment of the present application.

FIG. 13 is a block diagram of an electronic device configured to implement a video-based human behavior recognition method according to an embodiment of the present application. As shown in FIG. 13, the electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital assistant, cellular phones, smart phones, wearable devices, and other similar computing apparatuses. The components, their connections and relationships, and their functions shown herein are merely examples, and are not intended to limit the implementation of the application described and/or required herein.

As shown in FIG. 13, the electronic device includes: one or more processors 601, a memory 602, and interfaces for connecting various components, including a high-speed interface and a low-speed interface. The various components are connected to each other by using different buses, and can be installed on a common motherboard or installed in other manner as needed. The processor may process instructions executed in the electronic device, including instructions stored in or on the memory to display graphical information of the GUI on an external input/output device (such as a display device coupled to an interface). In other embodiments, if necessary, multiple processors and/or multiple buses can be used with multiple memories. Similarly, multiple electronic devices can be connected, with each device providing some necessary operations (for example, as a server array, a group of blade servers, or a multi-processor system). One processor 601 is shown as an example in FIG. 13.

The memory 602 is a non-transitory computer-readable storage medium provided by this application. The memory stores instructions that can be executed by at least one processor, so that the at least one processor executes the video-based human behavior recognition method provided in this application. The non-transitory computer-readable storage medium of the present application stores computer instructions that are configured to cause a computer to execute the video-based human behavior recognition method provided in the present application.

The memory 602 as a non-transitory computer-readable storage medium can be configured to store non-transitory software programs, non-transitory computer executable programs and modules, such as program instructions/modules corresponding to the video-based human behavior recognition method in the embodiment of the present application (for example, the first acquisition unit 31, the second acquisition unit 32, the construction unit 33, the convolution unit 34 and the recognition unit 35). The processor 601 executes various functional applications and data processing of the server by running the non-transitory software programs, instructions, and modules stored in the memory 602, that is, to realize the video-based human behavior recognition method in the above method embodiment.

The memory 602 may include a program storage area and a data storage area, where the program storage area may store an operating system and an application program required by at least one function; the storage data area may store data and the like created according to the use of the electronic device based on the video-based human behavior recognition method. In addition, the memory 602 may include a high-speed random-access memory, and may also include a non-transitory memory, such as at least one magnetic disk storage component, a flash memory component, or other non-transitory solid-state storage components. In some embodiments, the memory 602 may include a storage remotely provided with respect to the processor 601, and the remote storage may be connected via a network to an electronic device using a video-based human behavior recognition method. Examples of the aforementioned network include but are not limited to the Internet, corporate intranets, local area networks, mobile communication networks, and combinations thereof.

The electronic device of the video-based human behavior recognition method may further include: an input apparatus 603 and an output apparatus 604. The processor 601, the memory 602, the input apparatus 603, and the output apparatus 604 may be connected via a bus or in other means. In FIG. 13, the connection via a bus is shown as an example.

The input apparatus 603 can receive input digital or character information, and generate key signal input related to the user settings and function control of the electronic device based on the video-based human behavior recognition method. Examples of the input apparatus may include a touch screen, a keypad, a mouse, a track pad, a touchpad, a pointing stick, one or more mouse buttons, a trackball, a joystick and the like. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

The electronic device of the video-based human behavior recognition method may further include: a camera 605. The camera 605 is connected to the processor 601 and the memory 602 via a bus. Images and videos collected by the camera 605 can be sent to the processor 601 and the memory 602.

The various implementations of the systems and techniques described herein can be implemented in digital electronic circuit systems, integrated circuit systems, application specific ASICs (application specific integrated circuits), computer hardware, firmware, software, and/or combinations thereof. These various implementations may include: implementations in one or more computer programs. The one or more computer programs may be executed and/or interpreted on a programmable system including at least one programmable processor. The programmable processor may be a dedicated or general-purpose programmable processor, which can receive data and instructions from a storage system, at least one input apparatus, and at least one output apparatus, and can transmit the data and instructions to the storage system and the at least one input apparatus, and the at least one output apparatus.

These computing programs (also called programs, software, software applications, or codes) include machine instructions for programmable processors, and can be implemented utilizing high-level procedures and/or object-oriented programming languages, and/or assembly/machine languages. As used herein, the terms "machine-readable medium" and "computer-readable medium" refer to any computer program product, device, and/or apparatus, e.g., magnetic disks, optical disks, memory, programmable logic devices (PLD), used to provide machine instructions and/or data to a programmable processor, including machine-readable media that receive machine instructions as machine-readable signals. The term "machine-readable signal" refers to any signal configured to provide machine instructions and/or data to a programmable processor In order to provide interaction with a user, the systems and techniques described herein can be implemented on a computer that has: a display device configured to display information to the user (for example, a CRT (Cathode Ray Tube) or LCD (Liquid Crystal Display) monitor); and a keyboard and a pointing apparatus (for example, a mouse or a trackball), so that the user can provide input to the computer through the keyboard and the pointing apparatus. Other types of apparatuses can also be used to provide interaction with the user. For example, a feedback provided to the user can be in any form of sensory feedback (for example, a visual feedback, an auditory feedback, or a tactile feedback); and the input received from the user can be in any form (including a sound input, a voice input or a tactile input).

The systems and technologies described herein can be implemented in a computing system that includes back-end components (for example, as a data server), or a computing system that includes middleware components (for example, an application server), or a computing system that includes front-end components (for example, a user computer with a graphical user interface or a web browser through which the user can interact with the implementation of the systems and technologies described herein), or a computing system that includes any combination of such back-end components, middleware components, or front-end components. The components of the system can be connected to each other via digital data communication in any form or through any medium (for example, a communication network). Examples of the communication network include: local area network (LAN), wide area network (WAN), and the Internet.

The computer system may include a client and a server. The client and server are typically remote to each other and interact through a communication network. The relationship between the client and the server is established by computer programs running on the corresponding computers and having a client-server relationship with each other.

According to the technical solutions of the embodiments of the present application, the human object is analyzed based on the human rectangles and the human key points of the human object of adjacent video frames, that is, analysis is performed in the time dimension, thereby considering the relationship between the video frames of the front and rear frames, the deviation in video interpretation can be reduced, and the accuracy and recall rate of the human behavior category of the video can be improved. Moreover, the convolution result is also obtained with respect to the spatial dimension (the dimension of the key point quantity of the human rectangle). Based on two convolution results, the relationship between the human objects can be further strengthened, and the analysis of the behavior changes of the human objects based on time can be strengthened, and the human behavior category of the video can be obtained more accurately. Therefore, the behavioral actions and action tags of the video are obtained, which is conducive to optimize the convolution model and the recognition model and help the user smart device and other smart devices to interpret the video content.

It should be understood that steps can be re-ordered, added or removed when the various forms of processes shown above are used. For example, the steps described in the present application can be performed in parallel, or sequentially, or in a different alternative order, as long as the desired outcome of the technical solution disclosed in the present application can be achieved, which is not limited herein.

The foregoing specific implementations do not constitute any limitation on the protection scope of the present application. Those skilled in the art should understand that various modifications, combinations, sub-combinations, and substitutions can be made according to design requirements and other factors. Any modification, equivalent substitution and improvement made within the spirit and principles of this application shall be included in the protection scope of this application.

What is claimed is:

1. A video-based human behavior recognition method, comprising:
    acquiring a video to be recognized, wherein the video to be recognized comprises multiple video frames;

acquiring a human rectangle for each video frame of the video to be recognized, wherein each human rectangle comprises a plurality of human key points, and each of the human key points has a key point feature;

constructing a feature matrix according to the human rectangle of the each video frame, wherein the feature matrix comprises the key point feature of each of the human key points, a video frame quantity of the video frames in the video to be recognized, a key point quantity of the human key points in each human rectangle, and a human rectangle quantity of human rectangles in each video frame;

convolving the feature matrix with respect to a video frame quantity dimension to obtain a first convolution result and convolving the feature matrix with respect to a key point quantity dimension to obtain a second convolution result; and inputting the first convolution result and the second convolution result into a preset classification model to obtain a human behavior category of the video to be recognized.

2. The video-based human behavior recognition method according to claim 1, wherein the acquiring a video to be recognized comprises:

acquiring a video to be processed, and performing a frame extraction process on the video to be processed to obtain the multiple video frames so as to obtain the video to be recognized.

3. The video-based human behavior recognition method according to claim 1, wherein the acquiring a human rectangle of each video frame of the video to be recognized comprises:

inputting the video to be recognized into a single shot multiBox detector network model to obtain each human rectangle in each video frame;

inputting the each human rectangle in the each video frame into a preset recognition model to obtain the human key points in the each human rectangle, wherein the key point quantity of the human key points in the each human rectangle is V, and V=21.

4. The video-based human behavior recognition method according to claim 3, further comprising:

obtaining all human key points in a human rectangle by prediction according to the human key points in the human rectangle when it is determined that the human object in the human rectangle is obstructed or the key point quantity of the human key points in the human rectangle is not V.

5. The video-based human behavior recognition method according to claim 4, wherein the obtaining all human key points in a human rectangle by prediction according to the human key points in the human rectangle comprises:

determining a human skeleton structure of the human object in the human rectangle according to the human key points in the human rectangle;

determining all human key points of the human rectangle according to the human skeleton structure.

6. The video-based human behavior recognition method according to claim 1, wherein the human rectangle quantity in each video frame is M, and M is a positive integer; wherein M human rectangles are top M human rectangles with the highest human rectangle confidences in each video frame; and the method further comprises:

acquiring key point confidences of the human key points of each human rectangle in each video frame;

performing a weighted summation of the key point confidences of the human key points in each human rectangle to obtain a human rectangle confidence of the each human rectangle.

7. The video-based human behavior recognition method according to claim 1, wherein when a video quantity of the video to be recognized is N and N is a positive integer, the feature matrix further comprises the video quantity.

8. The video-based human behavior recognition method according to claim 1, wherein after the obtaining the human behavior category of the video to be recognized, the method further comprises:

when it is determined that the human behavior category is a preset category, issuing an alerting message, wherein the alerting message comprises one or more of the following: voice information, text information, lighting information, and box selection information.

9. The video-based human behavior recognition method according to claim 1, wherein after the obtaining the human behavior category of the video to be recognized, the method further comprises:

when it is determined that the human behavior category is a preset category, performing preset processing on the video to be recognized, wherein the preset processing comprises one or more of the following: repeated playback processing, deletion processing, and obstruction processing.

10. A non-transitory computer-readable storage medium, storing thereon computer instructions, wherein the computer instructions are used to cause the computer to execute the method according to claim 1.

11. An electronic device, comprising:

at least one processor; and a memory communicatively connected with the at least one processor, wherein:

the memory stores thereon instructions executable by the at least one processor, and the instructions are executed by the at least one processor to cause the at least one processor to:

acquire a video to be recognized, wherein the video to be recognized comprises multiple video frames;

acquire a human rectangle for each video frame of the video to be recognized, wherein each human rectangle comprises a plurality of human key points, and each of the human key points has a key point feature;

construct a feature matrix according to the human rectangle of the each video frame, wherein the feature matrix comprises the key point feature of each of the human key points, a video frame quantity of the video frames in the video to be recognized, a key point quantity of the human key points in each human rectangle, and a human rectangle quantity of human rectangles in each video frame;

convolve the feature matrix with respect to a video frame quantity dimension to obtain a first convolution result and convolving the feature matrix with respect to a key point quantity dimension to obtain a second convolution result; and input the first convolution result and the second convolution result into a preset classification model to obtain a human behavior category of the video to be recognized.

12. The electronic device according to claim 11, wherein the instructions cause the at least one processor to:

acquire a video to be processed, and perform a frame extraction process on the video to be processed to obtain the multiple video frames so as to obtain the video to be recognized.

13. The electronic device according to claim 11, wherein the instructions cause the at least one processor to:
    input the video to be recognized into a single shot multiBox detector network model to obtain each human rectangle in each video frame;
    input the each human rectangle in the each video frame into a preset recognition model to obtain the human key points in the each human rectangle, wherein the key point quantity of the human key points in the each human rectangle is V, and V=21.

14. The electronic device according to claim 13, wherein the instructions cause the at least one processor to:
    obtain all human key points in a human rectangle by prediction according to the human key points in the human rectangle when it is determined that the human object in the human rectangle is obstructed or the key point quantity of the human key points in the human rectangle is not V.

15. The electronic device according to claim 14, wherein the instructions cause the at least one processor to:
    determine a human skeleton structure of the human object in the human rectangle according to the human key points in the human rectangle;
    determine all human key points of the human rectangle according to the human skeleton structure.

16. The electronic device according to claim 11, wherein the human rectangle quantity in each video frame is M, and M is a positive integer; wherein M human rectangles are top M human rectangles with the highest human rectangle confidences in each video frame; and
    the instructions further cause the at least one processor to:
    acquire key point confidences of the human key points of each human rectangle in each video frame;
    perform a weighted summation of the key point confidences of the human key points in each human rectangle to obtain a human rectangle confidence of the each human rectangle.

17. The electronic device according to claim 11, wherein when a video quantity of the video to be recognized is N and N is a positive integer, the feature matrix further comprises the video quantity.

18. The electronic device according to claim 11, wherein after the human behavior category of the video to be recognized is obtained, the instructions further cause the at least one processor to do:
    when it is determined that the human behavior category is a preset category, issuing an alerting message, wherein the alerting message comprises one or more of the following: voice information, text information, lighting information, and box selection information.

19. The electronic device according to claim 11, wherein after the human behavior category of the video to be recognized is obtained, the instructions further cause the at least one processor to do:
    when it is determined that the human behavior category is a preset category, performing preset processing on the video to be recognized, wherein the preset processing comprises one or more of the following: repeated playback processing, deletion processing, and obstruction processing.

* * * * *